United States Patent [19]

Bodker

[11] 4,036,058
[45] July 19, 1977

[54] HOT SPOT THERMOMETER

[75] Inventor: John R. Bodker, Rochester, N.Y.

[73] Assignee: Qualitrol Corporation, Fairport, N.Y.

[21] Appl. No.: 711,995

[22] Filed: Aug. 5, 1976

[51] Int. Cl.² .......................... G01K 1/08; G01K 5/48
[52] U.S. Cl. ........................................ 73/350; 73/345; 73/357; 73/363
[58] Field of Search ................. 73/345, 349, 350, 357, 73/363

[56] References Cited

U.S. PATENT DOCUMENTS

| | | | |
|---|---|---|---|
| 1,630,307 | 5/1927 | Norwood et al. | 73/357 |
| 2,374,055 | 4/1945 | Treanor | 73/350 X |
| 3,383,919 | 5/1968 | Marcy et al. | 73/357 |
| 3,540,650 | 11/1970 | Boekelman et al. | 73/363 X |
| 3,960,017 | 6/1976 | Ronianowski | 73/350X |

Primary Examiner—Richard C. Queisser
Assistant Examiner—Charles Gorenstein
Attorney, Agent, or Firm—Stephen J. Rudy

[57] ABSTRACT

A thermometer unit for monitoring the temperature of a fluid cooled electric transformer, the thermometer unit having a ceramic body insertable between the coils of the transformer winding immersed in cooling fluid in the transformer case. A nylon rod responsive to heat changes is confined in the interior of the body and is adapted to expand and contract according to the heat changes to vary volume flow of a gas circulated by a pump in a closed circuit connected with the body. Variations in the gas pressure are indicated on a sight gage externally of the transformer.

5 Claims, 3 Drawing Figures

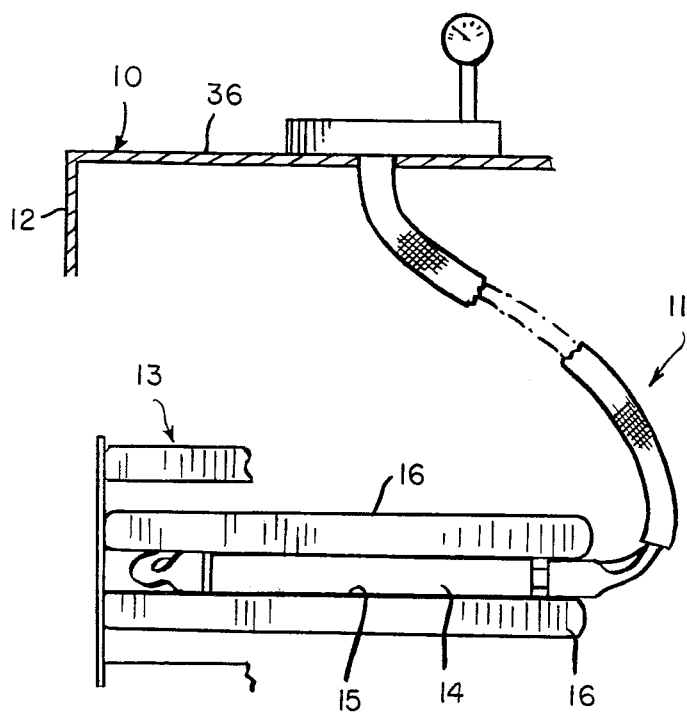
FIG. 1
FIG. 3
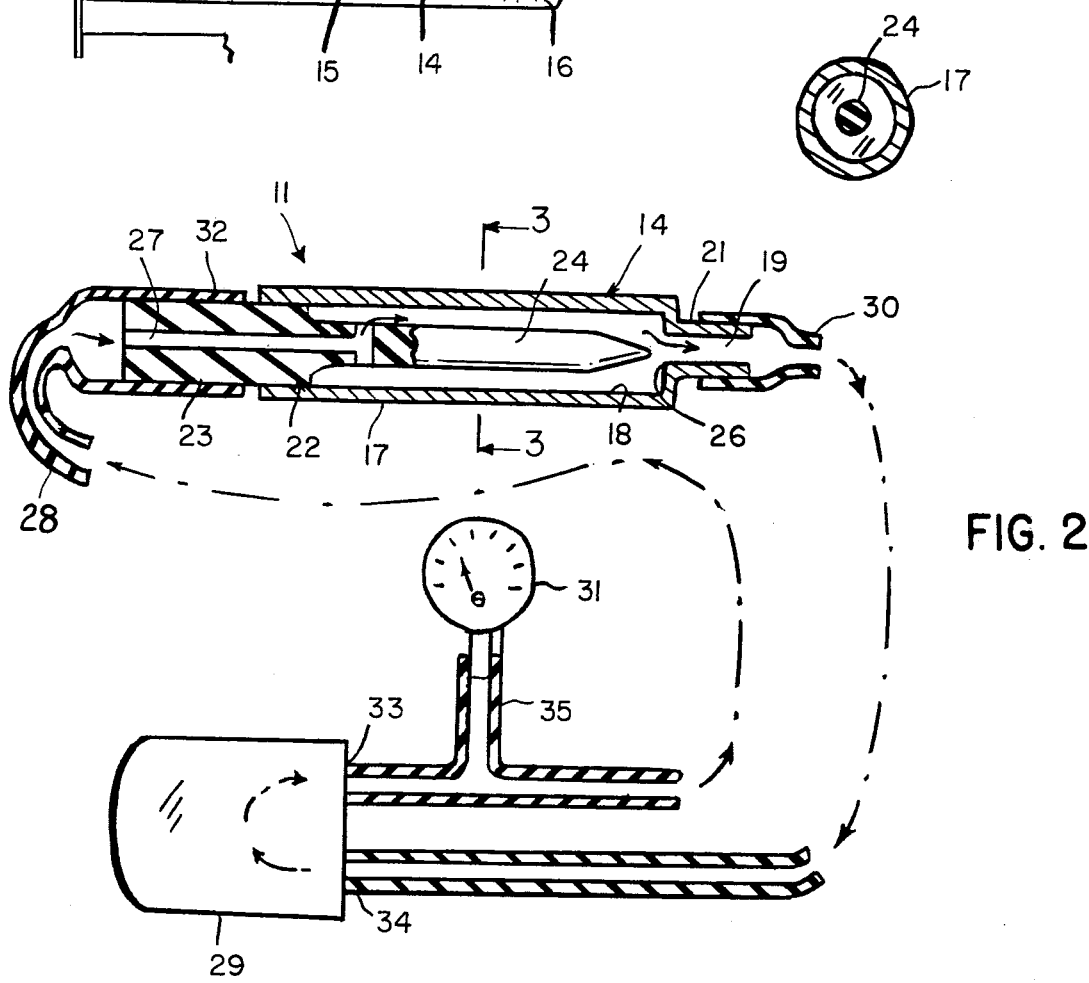
FIG. 2

HOT SPOT THERMOMETER

BACKGROUND OF THE INVENTION

This invention relates to thermometers and it is particularly cencerned with improvements in hot spot thermometers.

While a hot spot thermometer may have other applications, it is especially suited for use in sensing temperature changes in a fluid cooled electric transformer.

A hot spot thermometer is so named because of its structural characteristics whereby it is enabled to be located for temperatue monitoring purposes at the spot of hottest temperature development in a transformer. This spot is between the coils of the transformer winding.

This type of thermometer has various advantages. Because it is applied to the hottest area of the transformer, it obtains not only a more accurate reading but also a more rapid indication of temperatue changes than would be otherwise provided.

A hot spot thermometer is known from U.S. Pat. No. 3,960,017. It utilizes a high heat resistant cermaic body insertable between the coils of a transformer winding and containing a heat sensitive dielectric rod adapted to vary passage of light through fibre optic elements to produce in an external read-out instrument electrical signals indicative of temperature changes developing in the transformer.

An object of the present invention is to provide a hot spot thermometer which utilizes a high heat resistant ceramaic body insertable between the coils of a transformer winding and containing a heat sensitive rod which is cooperable with a closed tube containing a circulating gas to produce, according to variations in temperature in the transformer winding, pressure changes in the circulating gas, the pressure changes being readable on an associated pressure gage.

In accordance with the invention, there is provided the combination comprising an electrical transformer apparatus having a tank containing cooling fluid in which the coils of a transformer winding are immersed, a thermometer unit having a hollow open-ended body of ceramic dielectric material inserted into a space between the coils, the body being connected in a closed circuit filled with gas, a pump connected in the circuit for circulating the gas about the circuit, a heat sensing element of dieletric material arranged in the hollow of the body having response to temperature changes developing in the transformer winding to cause corresponding variations in the pressure of the circulating gas, and a sight gas pressure gage connected in the circuit adapted to indicate said pressure variations.

BRIEF DESCRIPTION OF THE DRAWING

In the accompanying drawing:

FIG. 1 is a picture view showing a fluid cooled transformer having an electrical winding with which the thermometer unit embodying the invention is associated;

FIG. 2 is a view of the thermometer unit partially in section and apart from the transformer; and FIG. 3 is a cross-section taken on line 3—3 of FIG. 2.

DESCRIPTION OF A PREFERRED EMBODIMENT OF THE INVENTION

In the accompanying drawing is disclosed a conventional fluid cooled high voltage transformer apparatus 10 to which a thermometer unit 11 embodying the invention has been applied. Only as much of the transformer apparatus has been shown as deemed needed to provide a proper understanding of the invention and its mode of application.

The transformer apparatus includes the usual tank 12 containing cooling oil in which the transformer winding 13 is immersed. The thermometer unit 11 has been applied to the transformer by inserting a heat sensor member 14 thereof into one of the usual spaces 15 separating the coils 16 of the winding.

The sensor member 14 includes a hollow open-ended body 17 formed of dielectric material, such as ceramics, which is capable of withstanding the high temperature that can develop in a transformer. The body is dimensioned in its thickness so as to obtain a friction fit when inserted between the coils of the winding and thereby insure its being retained in place.

The hollow of the body is defined by a major bore portion 18 extending for substantially the length of the body and opening out of a rear end of the latter, and by a short counterbore 19 of reduced diameter extending through a forward stem portion 21 of the body. A heat sensing non-metallic rod 22 formed of suitable dielectric material (here, nylon) is disposed in the major bore. An enlarged diameter rear portion 23 of the rod is fixedly fitted to the surrounding wall of the body and projects in part out of the latter. A forwardly extending elongated portion 24 of the rod is of reduced diameter so as to be free, of and to provide an annular clearance between it and, the surrounding wall of the body. A tip of the rod is disposed in close spaced relation to a seat 26 defined by a shoulder at the juncture of the major bore with the counterbore 19.

A passage 27 through the rod and body is connected by tubing 28, 30 in a closed fluid circuit with a motorized gas pump 29 and a sight pressure gage 31.

The tubing is of a dielectric non-metallic flexible material (here, silicon rubber). Section 28 has one end fitted over the projecting portion of the rod at 32, and its other end connected to a outlet port 33 from the pump. The second section 30 has one end fitted over the stem of the body and its other end connected to an inlet port 34 to the pump. A branch 35 off the first tubing section connects with the sight gage.

The tubing extends from the body 17 through a wall 36 of the tank to the outside. The sight gage and pump are located externally of the tank. The circuit is filled with a gas. Here, a gas known as sulfur hexafluoride is used.

In the use of the thermometer unit in association with the transformer, the pump is set in continuous operation causing the gas (indicated by the arrows) to be circulated around the closed circuit. The nylon rod 22 is adapted in response to change in temperature within the coils of the transformer winding to correspondingly expand and contract linearly relative to the seat so as to vary the volume of gas flow through the seat 26. Variations in gas pressure developing in the circuit because of variations in flow through the seats are indicated by the pressure responsive sight gage.

I claim:

1. The combination comprising an electrical transformer apparatus having a tank containing cooling fluid in which the coils of a transformer winding are immersed, a thermometer unit having a hollow-ended body of ceramic dielectric material inserted into a space between the coils, the body being connected in a closed circuit filled with gas, a pump connected in the circuit for circulating the gas about the circuit, a heat sensing element of dielectric material arranged in the hollow of the body expanding and contracting in response to temperature changes developing in the transformer winding to cause corresponding variations in the pressure of the circulating gas, and a sight gas pressure gage connected in the circuit adapted to indicate said pressure variations.

2. The combination as in claim 1, wherein the pump and sight gas pressure gage are located externally of the tank.

3. The combination as in claim 1, wherein the sensing element is a nylon plastics rod.

4. The combination as in claim 2, wherein the hollow of the body is part of the circuit and comprises a major bore and a minor bore, an annular shoulder being defined at the juncture of the bores, the sensing element is a nylon plastics rod having a thickened end fixed to a surroundng wall of the major bore and having a forwardy extending reduced portion free of the surrounding wall, the reduced portion having a tip disposed in close spaced relation to the shoulder, the circuit extending in part through the thickened end of the rod to connect with the major and minor bores, the heat sensing element being reponsive to heat of a predetermined value to expand linearly relative to the shoulder to restrict circulatin of the gas from the major bore to the minor bore.

5. A thermometer unit for sensing changes in the value of heat developing in an associated medium, comprising a body insertable into the medium, a heat sensing rod disposed internally of the body in a passage forming part of a closed fluid circuit, a gas fluid filling the circuit, a pump connected for circulating the gas about the circuit, the rod being responsive to heat of a predetermined value developing in the medium to restrict circulation of the gas through the passage and as a consequence cause a corresponding pressure change in the circulating gas, and a pressure gage connected in the circuit for indicating such pressure change.

* * * * *